United States Patent [19]  
Miki

[11] 4,023,868  
[45] May 17, 1977

[54] BEARING DEVICE  
[75] Inventor: Toshio Miki, Yao, Japan  
[73] Assignee: Koyo Seiko Company, Limited, Osaka, Japan  
[22] Filed: Apr. 29, 1976  
[21] Appl. No.: 681,770  
[30] Foreign Application Priority Data  
May 13, 1975 Japan ............................. 50-57593  
[52] U.S. Cl. ............................. 308/207 A; 308/9; 308/174  
[51] Int. Cl.² ......................................... F16C 9/00  
[58] Field of Search ............... 308/9, 35, 173, 174, 308/207 R, 207 A

[56] References Cited  
UNITED STATES PATENTS

| 3,304,139 | 2/1967 | Toth et al. | 308/207 R |
| 3,620,586 | 11/1971 | Maastricht | 308/207 A |
| 3,794,393 | 2/1974 | Hurd et al. | 308/207 A |
| 3,948,577 | 4/1976 | Gamet | 308/207 A |

Primary Examiner—Joseph F. Peters, Jr.  
Assistant Examiner—Richard A. Bertsch  
Attorney, Agent, or Firm—Mason, Fenwick & Lawrence

[57] ABSTRACT

A device comprising an outer ring formed with a cylindrical portion extending from its small diameter end at the radially inward portion thereof, a case having an inside surface including a large diameter cylindrical surface and a small diameter cylindrical surface to provide a stepped portion in the inside surface, the outer ring being received in the case in sliding contact with the large diameter cylindrical surface and the small diameter cylindrical surface, means for rendering the outer ring slidable only axially within the case, means for sealing the large diameter and small diameter sliding contact surfaces of the case and of the outer ring, and a pressure chamber defined by and provided between stepped portion end surfaces axially facing each other and formed between the large diameter and small diameter sliding contact surfaces of the case and of the outer ring to receive a pressure fluid. The pressure of the fluid within the chamber axially acts directly on the stepped portion end face of the outer ring to thereby automatically adjust the preload on the bearing.

4 Claims, 7 Drawing Figures

BEARING DEVICE

BACKGROUND OF THE INVENTION

The present invention relates to bearing devices, and more particularly to bearing devices of the preload adjustable type in which the preload to be applied to the bearing is properly variable with changes in the rotation conditions and loading conditions of the bearing.

Generally preload-adjustable roller bearings are adapted to carry radial and thrust loads. To improve the accuracy of rotation and rigidity of the bearing system for supporting a rotary shaft, the bearing is subjected to an axial preload and operated in the preloaded condition in which the clearances between the constituent members of the bearing are negative.

The amount of preload to be given to such bearing must be properly determined in accordance with the kind and amount of the load acting on the bearing, the speed of rotation of the bearing, accuracy of rotation required of the shaft, etc. However, even if the bearing is given a proper preload (initial preload) when mounted on the rotary shaft as installed in a housing, it becomes frequently necessary during rotation of the bearing to greatly alter the operating conditions of the machine in which the bearing is incorporated, consequently varying the rotational speed of the shaft and the load acting on the bearing and entailing thermal expansion of the shaft, housing, etc. due to heat generation. As a result, the initial preload applied to the bearing when it is mounted in place is seldom maintained as a proper preload always during and after a period of rotation of the bearing, and the acting preload may become excessive or insufficient, adversely affecting the rotation accuracy and performance of the bearing. Even during the rotation of bearing, furthermore, there arises the necessity of properly adjusting the preload with changes in the speed of rotation and the load on the bearing.

Accordingly in order to render the preload-adjustable roller bearing rotatable with improved accuracy and rigidity while supporting a rotary shaft, it is required to properly adjust the preload always in accordance with changes in the conditions involved during rotation.

A construction overcoming the above problem is known in which a preload-adjustable roller bearing for supporting a rotary shaft is installed in the housing of a machine portion, with the outer ring loosely fitted in the housing bore, the housing accommodating a pressing member for pressing and sliding the outer ring axially thereof and a member defining a pressure chamber having the pressing member as a movable member to apply the static pressure of a fluid to the pressing member so as to adjust the preload by altering the pressure of the chamber with changes in the speed of rotation of the bearing, bearing load and like conditions. However, because the outer ring subjected to the preload is adapted to be pushed by the fluid pressure through the pressing member which is separately made, the constituent members are likely to involve inaccuracies when they are machined and assembled. Moreover, the outer ring of the bearing loosely fitted in the housing has a usual axial dimension, namely the cylindrical outer ring surface in sliding contact with the inside surface of the housing has a short axial length, so that the outer ring inclines due to the clearance of loose fit to distort the sliding contact surfaces, consequently making it difficult or impossible to adjust the preload, or leading to uneven contact between the raceway surface of the outer ring and the rolling contact surfaces of the rolling elements. A serious trouble will then occur in the bearing. Moreover, since the bearing device is not provided with means for preventing the rotation of the axially slidable outer ring within the housing, creeping takes place during rotation of the bearing, producing wear on the sliding contact surfaces of the outer ring and housing as well as on the contact surfaces of the outer ring and pressing member and impairing accurate contact between these contact surfaces. This leads to misalignment of the pressing member relative to the outer ring and/or deteriorates the perpendicular relation of the contact surfaces of the outer ring and pressing member to the axis thereof, adversely affecting the accurate rotation and preload adjustment of the bearing. When creeping becomes pronounced, the metal-to-metal sliding friction between the foregoing sliding contact surfaces and between the contact surfaces causes wear or heat generation, which reduces accuracies of the outer ring and/or the pressing member, seriously impeding the axial sliding movement of the outer ring to make it more difficult to adjust the preload.

U.S. Pat. NO. 3,716,280 of R. L. Leibensperger et al. discloses a bearing device including a pressing member bearing against the large diameter end faces of tapered rollers to press the rollers axially thereof and a member defining a pressure chamber having the pressing member as a movable member for applying the static pressure of a fluid to the pressing member. However since the movable pressing member bears against the large diameter end faces of rolling tapered rollers, the accuracy of rotation of the bearing is adversely affected by a reduction in the perpendicularity, relative to the bearing axis, of the surface of the pressing member bearing against the end faces of the rollers when the pressing member slidingly moves in the axial direction and/or by a change in the position of contact between the pressing member and the large diameter end faces of the rollers due to the radial displacement of the pressing member. Moreover, such special construction is usable only in a greatly limited types of bearings. Furthermore, it is very difficult to machine the end surface of the pressing member to be contacted with the tapered rollers, since the surface must have the desired angle of contact and curvature with high precision. In addition, the pressing member needs to be inserted into an extremely confined annular space between the inner periphery of large diameter portion of the outer ring and the outer periphery of large diameter portion of a cage so as to be held in contact with the large diameter end faces of the tapered rollers. The thickness of the pressing member is consequently restricted, possibly leading to insufficient rigidity.

Thus conventional preload-adjustable bearing devices and means for varying the preload on the bearing have various drawbacks in practical uses and are not adapted for proper preload adjustment with good responsiveness in accordance with preload setting conditions such as rotation of bearing, load thereon and the like.

SUMMARY OF THE INVENTION

An object of this invention is to overcome various drawbacks of bearings of the type described and to provide a bearing in which the preload to be given to the bearing is properly and automatically adjustable as desired in accordance with changes in the preload setting conditions during rotation of the bearing.

Another object of this invention is to provide a device in which the outer ring of a bearing housed in a case of smoothly and stably slidable within the case axially thereof to ensure preload adjustment with greater ease.

Another object of this invention is to completely prevent creeping of the outer ring to be fitted in a case to prevent wear on the sliding contact surfaces thereof and to ensure high precision and rigidity of the bearing device over a prolonged period of time.

Another object of this invention is to reduce the number of the constituent parts of the bearing device of the type described so as to improve the precision of machining and assembling of the parts and to render the device easy to assemble and handle.

Still another object of this invention is to provide a bearing device of the foregoing type as a unit to render the device easily installable in machines for the ease of handling.

In order to fulfil the foregoing objects, the outer ring of a bearing adapted to carry radial and thrust loads is fitted in a case, the outer ring being integrally formed with a cylindrical portion axially extending from its small diameter end at the radially inside portion thereof. The case has two sliding contact inside surfaces, namely a large diameter cylindrical surface in sliding contact with the outside surface of the outer ring fitted in the case, and a small diameter cylindrical surface in sliding contact with the outside surface of the cylindrical portion. Thus the outer ring has sliding contact surfaces having a sufficient axial length.

The outer ring is prevented from creeping by guide means provided between the case and the outer ring for permitting the bearing fitted in the case to slide only axially. Sealing means are provided between the case and the outer ring to oil tightly seal the clearances between the pairs of mating sliding contact surfaces. A pressure chamber to which a pressure fluid is fed is defined by, and provided between, the opposed end surfaces of stepped portions between the large diameter and small diameter sliding contact surfaces of the case and of the outer ring, such that the pressure of fluid within the pressure chamber acts axially directly on the stepped portion end surface of the outer ring at the small diameter end of the ring.

According to this invention, therefore, the pressure of fluid such as oil fed to the pressure chamber formed between the case and the outer ring acts directly on the outer ring, axially sliding the outer ring within the case to preload the bearing. Since the amount of preload is adjustable by controlling the fluid pressure, transmission and adjustment of pressure can be achieved with much higher efficiency than in the conventional construction in which a pressing member is provided between the outer ring and pressure chamber. As a result, it is possible to always properly adjust the amount of preload on the bearing in accordance with changes in the preload setting conditions during rotation of the bearing.

Since the sliding contact surfaces of the outer ring axially extending on the opposite sides of the pressure chamber have a sufficient axial length for guiding the axial sliding movement of the ring, the outer ring is slidable smoothly and stably, permitting preload adjustment with improved smoothness. Further because the sliding contact surfaces of the outer ring and of the case having a great axial length are provided without increasing the axial length of the case, with the outer ring completely accommodated within the case, the assembly of the case, housing and like parts has a small width, which makes it possible to obtain a compact device. With the pressure chamber formed between the case and the outer ring to apply the fluid pressure directly on the outer ring end surface, the device can be composed of a reduced number of parts. This ensures machining and assembling with improved precision and renders the device easy to assemble and handle. Accordingly the device is available in the form of a unit including the bearing housed in the case.

Other objects and features of this invention will become more apparent from the following description.

DESCRIPTION OF THE PREFERRED EMBODIMENTS

Figure 1:
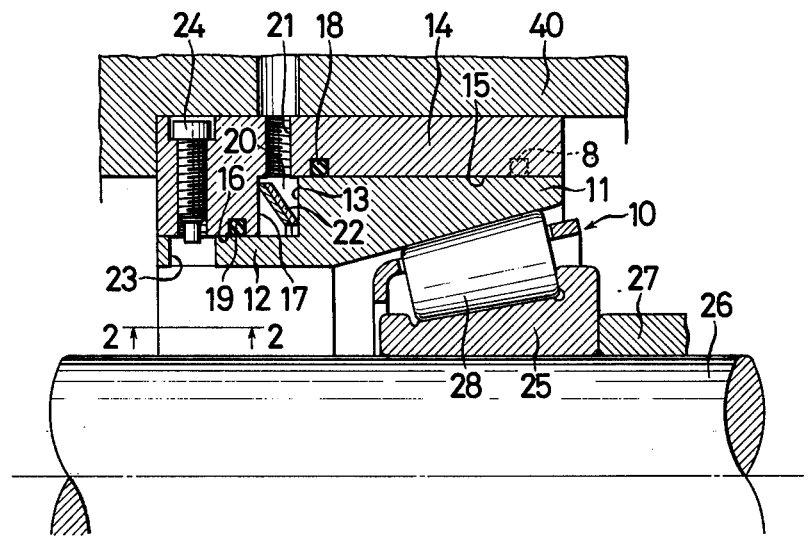
FIG. 1 is a view in vertical section showing an embodiment of this invention in which a tapered roller bearing is used, the lower half of the embodiment below its center line being omitted.

FIG. 1 shows a tapered roller bearing 10 as a preload-adjustable bearing which can be subjected to radial and thrust loads at the same time. However, the bearing is replaceable for example by a ball bearing of the angular type or like other bearing of the preloadable type.

The tapered roller bearing 10 has an outer ring 11 axially slidably fitted in a case 14. The outer ring 11 is integrally formed with a cylindrical portion 12 axially extending from its small diameter end 13 at the radially inside portion thereof. The case 14 has a large diameter cylindrical inside surface 15 in sliding contact with the outside surface of the outer ring 11 fitted in the case and a small diameter cylindrical inside surface 16 in sliding contact with the outside surface of the cylindrical portion 12, with an intermediate stepped portion formed between the surfaces 15 and 16. The large and small diameter surfaces permit the axial movement of the outer ring 11.

The pairs of large and small diameter surfaces of the case 14 and of the outer ring 11 in sliding contact with each other are oiltightly sealed by sealing means such as O-rings 18 and 19 in such manner that the sealing means will not impair the axial sliding movement of the outer ring 11. A pressure chamber 20 is formed between, and defined by, the end surface 17 of the inside stepped portion of the case 14 perpendicular to its axis and the end surface 13 of the outer ring opposed to the surface 17 face-to-face. The case 14 is formed at a suitable portion thereof with an inlet 21 for feeding a pressure fluid such as oil to the pressure chamber 20. The fluid inlet 21 is connected to a duct from an unillustrated pressure fluid feeder. The pressure chamber 20 accommodates a dished spring 22 or like compression spring to bias the outer ring 11 in the preloading direction and to thereby prevent the outer ring 11 from abruptly sliding in the opposite direction to the preloading direction when the fluid pressure in the pressure chamber 20 accidentally drops for one cause or another. Thus the spring serves to protect the bearing and the machine incorporating the bearing against serious damage to be otherwise caused by a sudden decrease in the preload upon the outer ring 11 sliding in the opposite direction as above. The compression spring 20 may be so adapted as to always bias the outer ring in the preloading direction, affording a minimum amount of preload to the bearing in the event of an accidental pressure drop within the pressure chamber 20.

The cylindrical portion 12 of the outer ring 11 is formed with an axial slot 23 in which a rotation preventing screw 24 screwed into the case 14 engages. The slot and the screw guide the axial movement of the outer ring 11. The opposite ends of the slot 23 in which the extreme end of the screw 24 is engageable limit the amount of axial sliding movement of the outer ring 11. The slot and the screw therefore act to retain the outer ring 11 in position against rotation and slipping off, thereby preventing creeping of the outer ring during rotation of the bearing. The inner ring 25 of the bearing is fixedly mounted on a shaft 26 by suitable means in known manner and is held against axial displacement by a spacer 27 or the like. The fluid pressure in the pressure chamber 20 directly presses the outer ring 11 rightward, causing the rolling elements 28 to be clamped between the inner and outer rings with negative clearances and thereby giving the bearing the desired preload. Indicated at 40 is a housing fixedly receiving the case 14.

The magnitude of the fluid pressure (static pressure) within the pressure chamber 20 is automatically controllable by the unillustrated pressure fluid feeder. Further an unillustrated detector may be provided for automatically controlling the pressure upon detecting changes in the preload setting conditions such as speed of rotation and load during rotation of the bearing so that the preload on the bearing can be always properly adjusted with changes in the preload setting conditions without interrupting the operation of the machine. Suitable known hydraulic devices may be used as such pressure fluid feeder, detector and automatic means therefor.

When the O-ring 18 sealing the large diameter sliding surfaces is disposed at the position indicated by a broken line 8 in FIG. 1 permitting the pressure fluid such as oil to enter the clearance between the surfaces, the oil film in the clearance assures the axial movement of the outer ring 11 within the case 14 with greater smoothness as well as more efficient preload adjustment. The lubricating oil film further acts to damp the vibration of the bearing, ensuring rotation of the shaft with improved precision.

Figures 2, 4:
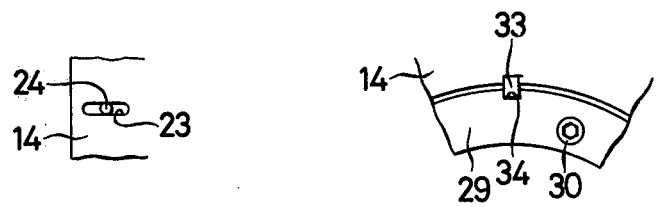
FIG. 2 is a fragmentary plan view taken along the line 2—2 in FIG. 1.
FIG. 4 is a fragmentary side elevation taken along the line 4—4 in FIG. 3.
Figure 3:
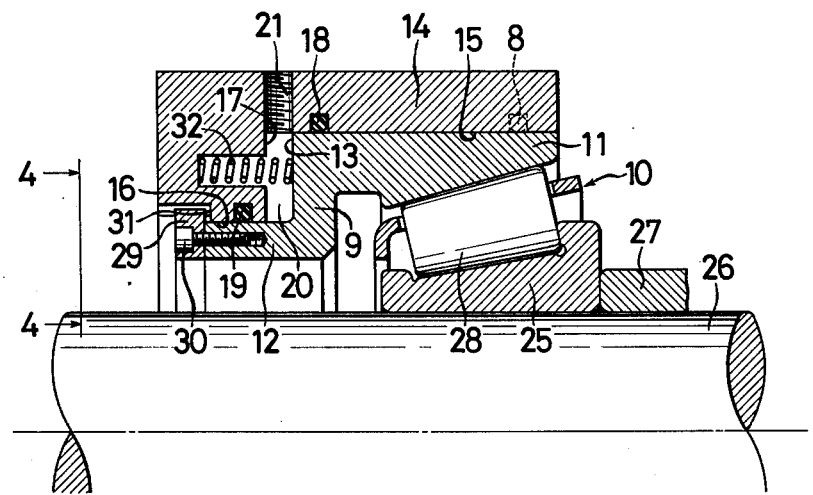
FIG. 3 is a view in vertical section corresponding to FIG. 1 and showing the main portion only of another embodiment of this invention.

FIG. 3 shows another embodiment of this invention. Similar parts of those shown in FIG. 1 are referred to by like reference numerals. An outer ring 11 has a large flange 9 radially inwardly extending from its small diameter end. The flange 9 has a cylindrical portion 12 extending from a radially inward portion of the end face 13 of the flange. The flange gives the outer ring 11 an increased area for receiving pressure from a pressure chamber 20. The cylindrical portion 12 has a ring 29 secured to the end face thereof by a screw 30 and opposed to a cutout stepped portion 31 of a case 14. The ring 29 limits the amount of axial movement of the outer ring 11 and prevents the ring from slipping off. In place of the dished spring of the first embodiment, the pressure chamber 20 accommodates a coiled spring 32 for preloading the bearing in the event of an accidental decrease in the preload. The outer ring 11 is prevented from rotation by an implanted key 33 secured to the case 14 and engaged in a groove 34 in the ring 29 as seen in FIG. 4. The rotation preventing means is replaceable by some other suitable means. The O-ring 18 for sealing the large-diameter sliding contact surfaces can be disposed at the position indicated by a broken line 8 in FIG. 3 as in the case of FIG. 1 to achieve the same effect as in the foregoing embodiment. The enlarged pressure receiving surface, namely the end face 13, of the outer ring defining the pressure chamber 20 makes it possible to give a sufficient amount of preload by low fluid pressure, while preventing deformation of case and outer ring due to the fluid pressure and thereby affording higher precision to the bearing device. On the other hand, the construction is applicable to a device to be heavily loaded by increased fluid pressure.

Figure 5:
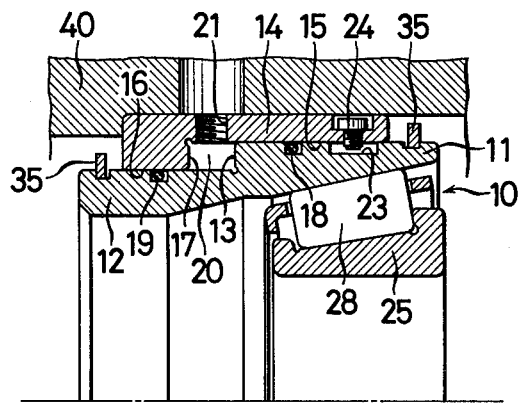
FIGS. 5, 6 and 7 are view in vertical section corresponding to FIG. 1 and respectively illustrating several modes of incorporating the present device into a machine for actual use.
Figure 6:
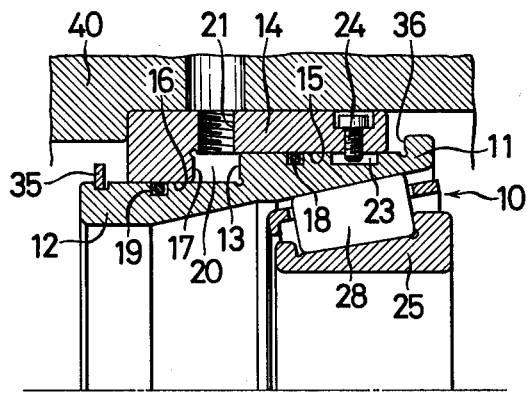
Figure 7:
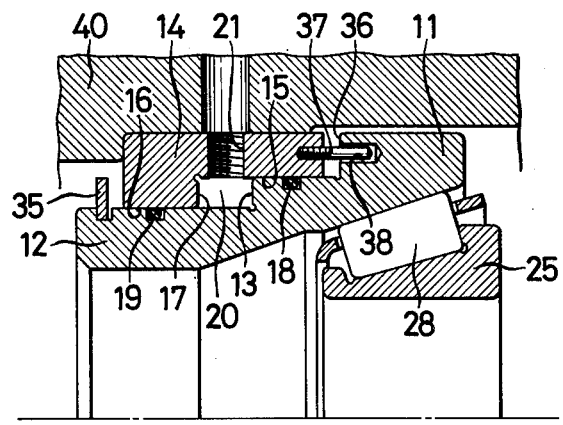

FIGS. 5 to 7 illustrate exemplary designs for incorporating the present device into machines. Similar parts to those shown in FIG. 1 are referred to by like reference numerals.

FIG. 5 shows stop rings 35 for preventing the outer ring 11 from slipping off. The outer end of the outer ring 11 and the outer end of the cylindrical portion 12 project outward from the case 14, and the stop rings 35 are fixedly fitted around the projections respectively. The outside surface of the outer ring 11 is formed with a slot 23 for preventing the rotation of the ring 11. A pin 24 fixedly mounted in the large diameter surface of the case 14 engages in the slot 23.

Fig. 6 shows the same design as FIG. 5 except that the outer ring 11 is prevented from slipping off by a flange 36 projecting from the outer periphery of the large diameter end of the ring. FIg. 7 shows the same construction as FIG. 6 except that the means for preventing slipping-off of the outer ring 11 comprises a pin 37 axially projecting from the end face of the case 14 and slidably engaged in a bore 38 formed in the flange 36 of the outer ring 11.

What is claimed is:

1. A device including a preload-adjustable roller bearing adapted to carry a radial load and a thrust load at the same time, the device comprising:
   an outer ring constituting the bearing and integrally formed with a cylindrical portion extending from its small diameter end at the radially inward portion thereof,
   a case having an inside surface including a large diameter cylindrical surface and a small diameter cylindrical surface to provide a stepped portion in the inside surface, the case receiving the outer ring fitted therein with its large diameter cylindrical surface in sliding contact with the outside surface of the outer ring, the small diameter cylindrical surface being fittingly in sliding contact with the outside surface of the cylindrical portion, the large diameter and small diameter sliding contact surfaces guiding sliding movement of the outer ring,
   guide means for rendering the outer ring slidable only axially within the case, means for sealing the large diameter and small diameter sliding contact surfaces of the case and of the outer ring, and a pressure chamber defined by and provided between stepped portion end surfaces axially facing each other and formed between the large diameter and small diameter sliding contact surfaces of the case and of the outer ring to receive a pressure fluid fed from a fluid inlet of the case, the pressure chamber causing the pressure of the fluid to act directly on the small diameter end face of the outer ring and to thereby press the outer ring in a preloading direction.

2. A device as defined in claim 1 further comprising a compression spring accommodated in the pressure chamber and biasing the outer ring in the preloading direction.

3. A device as defined in claim 1 wherein the means for sealing the large diameter sliding contact surfaces of the case and the outer ring is provided in the case so as to slidingly contact the outside surface of the outer ring at the large diameter end of the ring.

4. A device as defined in claim 1 wherein the guide means for guiding axial movement of the outer ring serves also to prevent the outer ring from slipping off the case.

* * * * *